United States Patent [19]

Delbouille et al.

[11] Patent Number: 4,649,182

[45] Date of Patent: Mar. 10, 1987

[54] POLYMERIZATION CATALYSTS AND METHODS OF PREPARATION THEREOF

[75] Inventors: André Delbouille; Jean-Louis Derroitte, both of Brussels, Belgium

[73] Assignee: Solvay & Cie, Brussels, Belgium

[21] Appl. No.: 768,173

[22] Filed: Aug. 22, 1985

Related U.S. Application Data

[63] Continuation of Ser. No. 549,021, Feb. 11, 1975, abandoned, which is a continuation of Ser. No. 235,775, Mar. 17, 1972, abandoned, which is a continuation of Ser. No. 808,638, Mar. 19, 1969, abandoned.

[30] Foreign Application Priority Data

Mar. 22, 1968 [FR] France .................................. 145133

[51] Int. Cl.$^4$ ......................... C08F 4/02; C08F 10/00
[52] U.S. Cl. .................... 526/125; 502/104; 502/107; 502/113; 502/117; 502/129; 502/134; 526/114; 526/115; 526/122; 526/348; 526/351; 526/352

[58] Field of Search ............... 502/104, 107, 113, 117, 502/129, 134; 526/114, 115, 122, 125

[56] References Cited

U.S. PATENT DOCUMENTS 3,238,146  3/1966  Hewett et al. ............. 260/44.9 DA
3,454,547  7/1969  Delbouille et al. ........ 260/44.9 DA

FOREIGN PATENT DOCUMENTS 1560467  2/1969  France .

*Primary Examiner*—Edward J. Smith
*Attorney, Agent, or Firm*—Pennie & Edmonds

[57] ABSTRACT

The catalysts are composed of an organometallic compound and a solid catalytic component which is the reaction product of a transition metal derivative and a solid support having a composition, at least on its surface, which corresponds to the formula $M(OH)_xX_y \cdot nH_2O$ wherein X is a halogen, M is a bivalent metal $1 > x > 0$, $y = 2-x$, and $1 > n \geq 0$. Polymerization and copolymerization of olefins are carried out advantageously using the new catalysts.

35 Claims, No Drawings

POLYMERIZATION CATALYSTS AND METHODS OF PREPARATION THEREOF

CROSS REFERENCE TO RELATED APPLICATIONS

This is a continuation of application Ser. No. 549,021, filed Feb. 11, 1975, now abandoned, which is a continuation of application Ser. No. 235,775, filed Mar. 17, 1972, abandoned, which is a continuation of application Ser. No. 808,638, filed Mar. 19, 1969, abandoned.

BACKGROUND OF THE INVENTION

This invention relates to polymerization catalysts and to a process of preparing the same. More particularly, this invention is directed to new solid catalysts which are suitable for the polymerization and the copolymerization of olefins and to a process of preparing the same.

U.S. Pat. No. 3,400,110 which was granted to Dassesse et al on Sept. 3, 1968 and which is incorporated herein by reference describes a process for the polymerization and the copolymerization of olefins in the presence of a catalyst obtained by activating with an organometallic compound, the reaction product of a compound of a transition metal with a solid compound comprising a hydroxychloride of a bivalent metal, which is preferably magnesium hydroxychloride, having the formula Mg(OH)Cl.

Though this is not yet established, it is believed that the reaction between the transition metal compound and the hydroxychloride of a bivalent metal, which produces the catalyst described in the above U.S. patent, is the result of a chemical bonding through the —OH groups of the hydroxychloride.

The catalytic complex comprises the following elements:

a bivalent metal M, preferably magnesium,
chlorine,
a transition metal M' bonded to the bivalent metal through oxygen,
reactive groups X bonded to the transition metal.

The catalytic polymerization processes described in the above U.S. patent, however, require that the bivalent metals be in the form of a hydroxychloride. These compounds which are not commercially available, cannot be obtained without difficulty and are costly to prepare.

SUMMARY OF THE INVENTION

It is an object of the present invention to provide transition metal catalysts chemically bonded to supports and a method of preparation thereof from readily available and/or easily prepared solid supports.

Another object of the present invention is the provision of catalysts having advantageous and improved properties and a method of preparation therefore, wherein the catalysts are obtained by the reaction of a transition metal compound reacted with a inorganic support.

Still another object of this invention is the provision of an improved method of polymerization and copolymerization of olefins and particularly of α-olefins with one another and with diolefins.

A further object of the present invention is the provision of an improvement in the method of polymerizing olefins as described in the above mentioned patent to Dassesse et al.

It has now been found that supported catalysts having certain specific advantages over the catalysts derived from hydroxychlorides are easily prepared.

According to the present invention, catalysts for the polymerization and the copolymerization of olefins are comprised of an organometallic compound and the reaction product between a transition metal derivative and a solid support whose composition, at least at the surface thereof, corresponds to the formula $M(OH)_xX_y\cdot nH_2O$ wherein X is a halogen, M is a bivalent metal, $1>x>0$, y equals $2-x$ and $1>n\geq 0$.

DESCRIPTION OF THE PREFERRED EMBODIMENTS

The solid supports which are used to carry out the object of the present invention may easily be obtained by partial hydrolysis of a bivalent metal halide, which may be carried out either before contact with the transition metal derivative or simultaneously therewith.

When the partial hydrolysis of the bivalent metal halide is carried out before contact with the transition metal derivative, the operation may be effected by contacting the anhydrous halide with water vapor heated to a suitable temperature, generally higher than 100° C.

The operation may also be carried out by simply heating a hydrated bivalent metal halide at a temperature between 50° and 350° C. since, upon drying of the hydrated product, there is a partial hydrolysis if the operating conditions are well chosen.

According to one of the most preferred embodiments of the invention, the partial hydrolysis of the halide may be carried out at the same time as the bonding of the derivative of a transition metal. In this case, the operation is preferably carried out by utilizing a slightly hydrated halide, i.e. a halide containing about 0.5 to 5 mols of water per molecule and particularly a monohydrate. The partial hydrolysis is produced by the water of hydration which has evolved during the heating step.

The possibility of partially hydrolyzing the halide simultaneously, as the bonding of the transition metal derivative on the support is carried out, is particularly unexpected since it has been generally believed that the presence of free water during the bonding reaction is detrimental to the reaction and also that free water results in the production of catalysts having unsuitable properties.

For this reason the supports have always been dried with utmost care prior to the reaction.

It has now been discovered that the presence of small amounts of water of hydration, can be tolerated during the bonding reaction, if measures are taken to prevent the reaction from being too violent and to assure that the reaction mixture does not solidify.

The solid supports which bind the transition element derivatives should have, at least at the surface thereof, a composition corresponding to the formula $M(OH)_xX_y\cdot nH_2O$ in which M is a bivalent metal selected from the group comprising magnesium, calcium, chromium, manganese, iron, nickel, cobalt, copper, zinc and cadmium X is a halogen, selected from the group comprising chloride, fluorine, bromine or iodine, x is higher than 0 and lower than 1, preferably between 0.1 and 0.8, y equals $2-x$ and n is lower than 1, preferably in the neighborhood of, or equal to 0.

These reactive supports can be obtained by one of the above defined methods of hydrolysis, from the corresponding halides or hydrated halides.

In practice, the easiest method of hydrolysis is generally chosen and this depends on the nature of the product which is available and on its properties.

The granulometry of the support is not critical and has very little influence on the bonding reaction. However, the aspect and the granulometry of the polymer is dependent on the granulometry of the support. For this reason, it is preferred to use supports having a coarse granulometry in which the particles have an average diameter higher than 10 microns.

The transition metal derivatives which may be used for the preparation of the polymerization catalysts are selected from the group consisting of the derivatives of the metals of Groups IVb, Vb and VIb of the Periodic Table, such as the halides, oxyhalides, alkoxyhalides, oxyalkoxides, and alkoxides of these metals. The derivatives which are liquid under the reaction conditions are preferred, such as $TiCl_4$, $TiCl_2(OC_2H_5)_2$, $Ti(OC_4H_9)_4$, $VCl_4$, $VOCl_3$, $VO(OC_4H_9)_3$ and $CrO_2Cl_2$.

The reaction between the transition metal derivative and the reactive support is preferably carried out in the absence of solvent by simply suspending the support or its precursor in the transition metal derivatives used practically pure in liquid form, to prevent a precipitation of hydrolysis products which have only little activity and are undesirable during the polymerization process.

However, the reaction between extensively hydrated derivatives, particularly monohydrated halides, and certain transition metal derivatives, particularly halides and oxyhalides, may be highly exothermic and, if there is an appreciable heating of the reaction mixture, this may lead to a complete solidification thereof, or at least, it may produce catalysts which are only slightly active. For this reason, when the reaction is likely to be highly exothermic, as with the uses of the most highly hydrated halides employed in the present process, the process is carried out under conditions which prevent overheating.

Generalized overheating may be avoided by the use of a relatively large quantity of liquid; however, local overheating at the surface of the solid causes lumping and solidification thereof which should be prevented. It is preferable, therefore, to mix the hydrate with the halide initially at a temperature of about 10° to 40° C., most preferably at ambient temperature with violent stirring. In addition, the liquid phase, pure halide, or solvent and halide, should be present in large excess in the reaction medium; the weight ratio of liquid to solid should be preferably comprised between 50:1 and 3:1 more advantageously from 20:1 to 4:1.

Other expedients may also be taken to avoid localized overheating. For example, a stream of the cooled transition metal derivative may be circulated on the support, at such a speed that even localized overheating is avoided. It is also possible to allow the support, in powder form, to fall as a mist, in a large quantity of cold transition metal derivative.

The suspension is then heated to a suitable temperature in order that the reaction be carried out at a temperature generally comprised between 40° and 180° C.

After the bonding reaction, the resulting solid catalyst may be extracted by means of the transition metal derivative itself heated to a temperature between 40° and 180° C.

A certain amount of transition metal derivative remains bonded on the solid substance to constitute the catalyst support and it cannot be removed therefrom by physical means alone. It has indeed been observed that a certain amount of transition metal compound is not eliminated when washing with a hydrocarbon solvent even after the bonding reaction.

The resulting catalytic complex comprises the essential elements of catalytic complexes which have previously been derived from bivalent metal hydroxychloride, for example:

a bivalent metal M, preferably magnesium, calcium, manganese or cobalt, a halogen, oxygen, a transition metal chemically bonded to the support through oxygen, various substituents, which may be halogenated, bonded on the transition metal.

In the new catalysts, however, the composition and the nature of the substance of the support can differ from the surface thereof, since partial hydrolysis may be limited to superficial layers of the support for the production of active complexes. Furthermore, the proportions of these various elements are different than those of previously obtained catalytic complexes. Particularly, the halogen/M ratio differs from 1.

After the washing step, the resulting catalyst must be activated by contacting it with an organometallic derivative of a metal of Groups I, II, IIIa or IVa of the Periodic Table. As used herein, the term organometallic compounds includes organosilicon compounds in accordance with the usage in *Organometallic Chemistry*—Selected Topics in Modern Chemistry by E. G. Rochow, Reinhold Publishing Corp., 1964 and *The Chemistry of Organometallic Compounds*, by E. G. Rochow. D. T. Hurd and R. N. Lewis, John Wiley and Sons, 1957. Organometallic halides and hydrides and completely alkylated derivatives thereof, such as dialkylaluminum halides, alkylmagnesium halides, alkylaluminum hydrides, alkyltin hydrides, and organic compounds of silicon having at least one Si—H bond may be used as activators, wherein trialkyl aluminum compounds are preferred, As examples of such activators triethylaluminum, triisobutylaluminum, tri-n-octylaluminum, diethylaluminum chloride, ethylmagnesium bromide, diisobutylaluminum hydride, tri-n-butyltin hydride, triethylsilane, methyl hydrogen silicone oil may be mentioned.

The amount of activator employed is not critical as long as there is a molar excess thereof over the transition metal bonded on the support. The activator/bonded transition metal molar ratio is preferably between 10 and 50.

The activation may be carried out immediately before introducing the monomers; however, the catalyst may also be allowed to age at room temperature or higher, for a more or less extended period of time.

The catalysts according to the invention are used for the polymerization and the copolymerization of olefins, such as for the production of polyethylene, polypropylene and ethylene-propylene copolymers. The present catalyst may also be used for the copolymerization of α-olefins with diolefins including linear aliphatic, monocyclic and alicyclic dienes having an endocyclic bridge such as 1,4-pentadiene, 1,3-divinylcyclohexane and norbornadiene.

When used for the polymerization of ethylene, it has been found that the catalysts according to the present invention have extremely high activities and the polyethylene produced therewith has exceptional properties. The linearity of polyethylene so produced is such that it contains less than one $CH_3$ group per 1,000 carbon atoms. The product contains no trace of transinternal unsaturation and only 0.01 to 0.20 vinyl double bonds and 0.01 to 0.1 vinylidene double bonds per 1,000 carbon atoms. The specific weight of this product is equal to or higher than 0.968 g./cm.$^3$, which makes it particularly suitable for injection molding applications.

Besides these properties which are common to a certain number of catalysts chemically bonded to supports, the catalysts according to the present invention possess particularly advantageous characteristics.

They are particularly suitable for the production of low, and even very low molecular weight polyethylene, without requiring the use of very high partial pressures of hydrogen.

In addition, these catalysts are much less sensitive than most of the known catalysts to the poisoning action of agents destroying the activity of polymerization catalysts, such as water and oxygen.

Finally, these new catalysts are characterized by a high stability, a low content of transition element compounds and an extremely high activity, with the consequence that only a very low amount can be found as inert, harmless residues in the product coming out of the polymerization reactor. For this reason no purifying treatment is required and the polymerized product may be used as such. The production of the new catalysts according to the invention, allows a very important simplification of the polymerization apparatuses and a corresponding reduction of the cost of the product.

Also, the ethylene-propylene copolymers obtained by the process according to the invention have a particularly high propylene content which are characterized by an amorphous structure and by excellent elastomeric properties.

The polymerization and the copolymerization may be carried out according to any known procedures, in the gaseous phase, in the absence of a liquid medium which is a solvent of the monomer, or in the presence of a dispersing medium in which the monomer is soluble. An inert hydrocarbon which is liquid under the conditions of polymerization or the monomers themselves, in a liquid state under their pressure of saturation, may be used as a liquid dispersing medium.

To produce elastomeric copolymers of ethylene and propylene, the catalysts according to the invention may be used in suspension in the liquid monomers, resulting in granular products which are easily handled. With most of the known catalysts, on the contrary, under these conditions, a compact rubbery mass is obtained, which is not easily handled; furthermore, the reaction must be carried out in solution.

The following examples are given to illustrate the best modes currently contemplated for carrying out the invention, but are not to be construed as restricting the scope thereof.

EXAMPLE 1

Magnesium fluoride is hydrolyzed in a glass reactor heated to 400° C., by contacting 20 g. of pure $MgF_2$ intended for analysis, with nitrogen, saturated with water by bubbling at a temperature of 70° to 80° C.

After a reaction period of 6 hours, the entry of wet nitrogen is stopped, the reaction mixture is flushed for 6 hours with dry nitrogen at 300° C., the content of the reactor is allowed to cool and crushed. The resulting product contains 8.5 g. of hydroxyl groups per kilogram measured with a thermoscale.

Of this product, 11.5 g. are placed in a glass reactor provided at the lower portion thereof with a sintered glass plate and having a cooler at the upper portion thereof. Cold $TiCl_4$ in an amount of 50 ml. is introduced and after 5 minutes contact at ambient temperature, the mixture is heated at 130° C. for 1 hour. $TiCl_4$ is then separated by filtration through the sintered glass plate and the content of the reactor is washed 20 times with hexane. The resulting catalytic complex contains 3.8 g. of Ti/kg.

The above solid catalyst in an amount of 1.019 g. is suspended in 500 ml. of hexane, in a 1.5 liter stainless steel autoclave. In this suspension, there are introduced 2 ml. of a solution containing 500 g. per liter of triisobutylaluminum in hexane. The temperature of the autoclave is raised to 80° C. and ethylene is introduced under a pressure of 4 kg./cm.$^2$ and hydrogen under a pressure of 8 kg./cm.$^2$.

After a reaction period of 2 hours under a pressure which remains constant through a continuous addition of ethylene, the autoclave is degassed and 132 g. of polyethylene are extracted, which corresponds to a catalytic activity of 4300 g. of PE/h.g.Ti.atm. $C_2H_4$.

By way of comparison, polymerization was carried out under identical conditions, but using a catalyst obtained from $MgF_2$ which has not been partially hydrolyzed and to which 1.5 g. Ti/kg. had been bonded. After 2 hours, only traces of polymer were produced.

EXAMPLES 2 TO 4

$MgBr_2$ samples were prepared with different rates of hydrolysis by submitting identical samples of pure $MgBr_2.6H_2O$ intended for analysis to thermal treatments which are increasingly prolonged and severe.

The treatment conditions and the analytical data concerning the resulting products are given in the following Table 1.

TABLE 1

|  | Example 2 | Example 3 | Example 4 |
| --- | --- | --- | --- |
| Conditions of hydrolysis | 3 hr. at 120° C. 4 hr. at 160° C. | 40 hr. at 110° C. 24 hr. at 130° C. 6 hr. at 140° C. | 1 hr. at 100° C. 4 hr. at 200° C. 1.5 hr. at 205° C. |
| Analytical data of hydrolysis product |  |  |  |
| Mg g./kg. | 114 | 133 | 188 |
| Br g./kg. | 669 | 672 | 694 |
| OH + $H_2O$ g./kg. (determined by difference) | 217 | 185 | 118 |
| Rough estimate of formula | $MgBr_{1.8}(OH)_{0.2}$ 2.4 $H_2O$ | $MgBr_{1.5}(OH)_{0.5}$ 1.5 $H_2O$ | $MgBr_{1.1}(OH)_{0.9}$ |

About 11 g. of each of the above described hydrolysis products are allowed to fall in powder form into 50 ml. of pure $TiCl_4$ at room temperature and the mixture is heated to 130° C. under stirring for 1 hour; then the solid product is transferred into the basket of a Kumayawa type extractor and the extraction is carried out for 1 hour with boiling $TiCl_4$. Washing is carried out with hexane until elimination of all traces of $TiCl_4$ which are not chemically bound.

The resulting solid products were used to polymerize ethylene according to the procedure described in Example 1. The specific operating conditions of each polymerization and the results obtained are given in Table 2.

TABLE 2

|  | EX-AMPLE 2 | EX-AMPLE 3 | EX-AMPLE 4 |
|---|---|---|---|
| Analytical data concerning the catalytic complexes |  |  |  |
| Mg g./kg. | 119 | 158 | 190 |
| Br g./kg. | 383 | 347 | 694 |
| Cl g./kg. | 246 | 317 | 5 |
| Ti g./kg. | 87 | 48 | 0.7 |
| OH + $H_2O$ (determined by difference) g./kg. | 165 | 130 | 110 |
| Ratio OH + $H_2O$/Mg | 1.87 | 1.12 | 0.83 |
| Polymerization |  |  |  |
| Quantity of catalytic complex g. | 0.115 | 0.193 | 2.00 |
| Quantity of activator [Al(iBu)$_3$] g. | 1.000 | 1.000 | 0.900 |
| Temperature °C. | 80 | 80 | 80 |
| Duration hr. | 2 | 1 | 2 |
| Partial pressure $C_2H_4$ kg./cm.$^2$ | 4 | 6.33 | 4 |
| Partial pressure $H_2$ | 8 | — | 8 |
| Quantity of PE produced g. | 58 | 215 | 92 |
| Specific activity g.PE/hr.g.Ti atm. $C_2H_4$ | 730 | 3730 | 8100 |
| Total productivity g.PE/g. cat.complex | 504 | 1110 | 46 |

It is therefore realized that if a certain quantity of water which is present in the support used for the preparation of the catalytic complex is not absolutely harmful, the catalytic activity is nevertheless decreased. However, the presence of water causes an increase of the quantity of transition element bonded to the support, which in some cases, increases the productivity of the catalyst.

The water, which is present in the support reacting with $TiCl_4$, is in excess in the case of Examples 2 and 3, but ensures in this case the continuation of the hydrolysis in the reaction medium. The latter is also accompanied by a dehydration and leads to the formation "in situ" of a support showing the desired composition.

In the catalysts of this invention, the range of bonded transition metal per support material extends practically from 0.5 to 130 g./kg., and preferably from 5 to 70 g./kg. A very small amount of transition metal fixed, even if it is extremely active, means a low productivity per g. of catalytic complex and a larger quantity of support present in the polymer after reaction. On the contrary, a high amount of fixed titanium, is nearly always associated with a low activity of the titanium. So the medium range from 5 to 70 g./kg. is preferred.

EXAMPLES 5 TO 8

A series of catalytic complexes are prepared from $MgCl_2.H_2O$ using the simultaneous partial hydrolysis and bonding technique, by reacting $MgCl_2.H_2O$ with $TiCl_4$ in the manner described in Example 1. The reactions and the analyses of the catalytic complexes obtained are given in the following Table 3.

TABLE 3

| Example 8 (comparative) |  | Example 5 | Example 6 | Example 7 |
|---|---|---|---|---|
| 12.86[1] | Quantity of $MgCl_2.H_2O$ g. | 16.92 | 11.997 | 12.0 |
| 50 | Quantity of $TiCl_4$ ml. | 50 | 50 | 50 |
| 130 | Temperature of reaction °C. | 130 | 130 | 130 |
| 1 | Duration of reaction hr. | 1 | 1 | 3.75 |
| 156 | Ti content of product g./kg. | 12 | 16 | 22 |
| 580 | Cl content of product g./kg. | 661 | 666 | 704 |
| 134 | Mg content of product g./kg. | 222 | 222 | 229 |
| 130 | OH content determined by g./kg. difference | 105 | 96 | 45 |
| 1.4 | Ratio OH/Mg | 0.68 | 0.62 | 0.28 |
| — | Ratio Cl added/Ti | 4.3 | 4.1 | 4.1 |

[1]Test carried out with more highly hydrated Mg halide: $MgCl_2.1.75\ H_2O$ prepared by drying $MgCl_2.6\ H_2O$ The data given in Table 3 show that the bonding of $TiCl_4$ on $MgCl_2.H_2O$ is accompanied by the formation of a derivative which is more or less hydroxylated according to the reaction conditions. According to these data, it would appear that $TiCl_4$ is added at least stoichiometrically as such to this derivative to give a catalytic complex.

Polymerization reactions were carried out with the solid catalysts prepared as described above, according to the mode of operation of Example 1, under the conditions specified in Table 4.

TABLE 4

| Catalyst Prepared in Example Nos. | POLYMERIZATION CONDITIONS | | | | | RESULTS | | | |
|---|---|---|---|---|---|---|---|---|---|
|  | Amount of solid catalyst used mg. | Triisobutyl aluminum used mg. | Duration hr. | Partial pressure $C_2H_4$ kg./cm.$^2$ | Partial pressure $H_2$ kg./cm.$^2$ | Polyethylene produced g. | Catalytic activity g.PE/g.Ti.h. atm. $C_2H_4$ | Productivity g. of PE/g. of solid catalyst | Melt index g./10 min. |
| 5 | 988 | 1000 | 2 | 2 | 4 | 84 | 1800 | 85 | 13.7 |
| 6 | 450 | 1000 | 2 | 2 | 4 | 13 | 448 | 29 | 6.3 |
| 7 | 220 | 200 | 2 | 2 | 4 | 5 | 260 | 23 | — |
| 8[c] | 167 | 200 | 2 | 2 | 4 | 3 | 28 | 18 | — |

[c]Comparative

The results given in Table 2 show the advantages of using the catalysts according to the invention which have been prepared from catalytic complexes in which the OH/Mg ratio is lower than 1 and which has been obtained from monohydrated halide, over related catalysts, such as the one described in Example 8, given by way of comparison, in which the OH/Mg ratio of the catalytic complex is higher than 1, and which is derived from a more extensively hydrated halide.

These results also illustrate the exceptional sensitivity of the better catalysts towards hydrogen, i.e. those obtained from catalytic complexes in which the OH/Mg ratio is higher than 0.5 (Examples 5 and 6). For example, with partial pressure of hydrogen attaining only 4 kg./cm.$^2$, these catalysts produce polyethylene in which the melt index reaches 13 g. per 10 minutes while with known catalysts such as those described in U.S. Pat. No. 3,400,110 polyethylene has a melt index of only about 8 g. per 10 minutes.

EXAMPLE 9

8.24 g of $MgCl_2.H_2O$ are reacted with 20.88 g. of $TiCl_2(OC_2H_5)_2$ in solution in heptane during 1 hour at 100° C. in the apparatus described in Example 1. The product obtained is carefully washed with heptane, then with hexane, and is then dried under vacuum until the weight remains constant.

The composition of the resulting product is the following:

Mg: 135 g./kg.
Cl: 474 g./kg.
Ti: 110 g./kg.

The $OH+H_2O$/Mg ratio of this product is estimated to be 0.85.

This solid catalyst is in an amount of 0.317 g. and 1.0 g. of triisobutylaluminum are used to carry out the polymerization of ethylene according to the procedure described in Example 1, under partial pressures of ethylene and hydrogen, respectively of 8 kg./cm.$^2$ and 16 kg./cm.$^2$. After 2 hours, 10 g. of polyethylene are obtained, representing a catalytic activity of 19 g. PE/h.g.Ti.atm. $C_2H_4$.

EXAMPLE 10

As described above, 8.72 g. of $MgCl_2.H_2O$ are reacted with 19.1 g. of $CrO_2Cl_2$ dissolved in 40 ml. of pure $CCl_4$. After 2 hours at 100° C., the mixture is cooled, then the solid product is washed with hexane and dried under vacuum.

There are obtained 8.44 g. of a solid product having the following composition:

Mg: 212 g./kg.
Cl: 604 g./kg.
Cr: 6.7 g./kg.

A polymerization test carried out with 1.01 g. of the above solid catalyst, 0.5 g. of Al(iBu)$_3$ and ethylene under a pressure of 20 kg./cm.$^2$ has given 2.5 g. of polyethylene during 5 hours.

EXAMPLE 11

26 g. of pure $MgI_2.8H_2O$ intended for analysis, are dried under vacuum, first at room temperature then by progressively heating to 140° C. There are obtained 18 g. of a product having the following rough estimate formula $MgI_{1.5}(OH)_{0.5}.3.3H_2O$.

This product is reacted with $TiCl_4$ under the conditions given in Example 2 to give a solid catalyst having the following analysis:

Mg: 150 g./kg.
I: 284 g./kg.
Cl: 360 g./kg.
Ti: 38 g./kg.
$H_2O+OH$ (determined by difference): 168 g./kg.

The $OH+H_2O$/Mg ratio of this catalyst has been estimated at about 1.55 and the Cl/Ti ratio, at 12.8, which indicates that most probably there has been a chlorine-iodine exchange.

Polymerization carried out according to the mode of operation given above, with 0.135 g. of this solid catalyst and 0.2 g.of triisobutyl aluminum used as activator, has produced 107 g. of polyethylene after 30 minutes under partial pressures of ethylene and hydrogen, respectively of 4 kg./cm.$^2$ and 8 kg./cm.$^2$. The catalytic activity was 10,520 g. PE/h.g. Ti.atm. $C_2H_4$ and the productivity was 800 g. PE by g. of solid catalyst. The melt index of the product was 16.0 g. per 10 minutes.

EXAMPLE 12

$FeCl_2.4H_2O$ in an amount of 40 g. was dried for 8 hours at 100° C. with a flow of pure, dry HCl. There are obtained 29 g. of a product having the following rough estimate formula: $FeCl_2.1.2H_2O$.

This product is used as catalyst support and contacted with pure $TiCl_4$ at a temperature of 140° C. according to the mode of operation of Example 1.

The resulting solid catalyst has the following composition:

Fe: 410 g./kg.
Cl: 545 g./kg.
Ti: 11 g./kg.
$H_2O$ or OH (determined by difference): 34 g./kg.

The OH/Fe ratio is 0.28 and the "additional Cl/Ti" ratio is 4.87.

The polymerization of ethylene carried out under the conditions of Example 1 with 0.238 g. of solid catalyst and 0.200 g. of triisobutylaluminum used as activator, under partial pressures of ethylene and hydrogen, respectively of 2 kg./cm.$^2$ and 4 kg./cm.$^2$, has resulted in 151 g. of polyethylene after 2 hours. The catalytic activity was 10,280 g. PE/h.g.Ti.atm. $C_2H_4$ and the productivity was 634 g. PE/g. of solid catalyst.

EXAMPLE 13

50 g. of $NiCl_2.6H_2O$ were suspended in 100 ml. of $SOCl_2$ and heated under reflux for 2 hours. The solid product was poured off and washed in hexane, then dried. The resulting product has the following rough estimate formula: $NiCl_2.1.1H_2O$.

The reaction with $TiCl_4$ is carried out as specified in Example 2 and has produced a solid catalyst comprising:

Ni: 376 g./kg.
Cl: 501 g./kg.
Ti: 23 g./kg.
OH (determined by difference): 100 g./kg.

which means that the OH/Ni ratio is 0.92 and the "additional Cl/Ti" ratio is 2.3.

The polymerization carried out with 0.589 g. of this solid catalyst and 0.200 g. of Al(iBu)$_3$ under the conditions specified in Example 17 has produced 75 g. of polyethylene, indicating a catalytic activity of 1400 g./h.g.Ti.atm. $C_2H_4$.

EXAMPLE 14

Example 13 is repeated by replacing $NiCl_2.6H_2O$ with $CoCl_2.6H_2O$. Drying with $SOCl_2$ has given a product of the formula $CoCl_2 \cdot 0.42H_2O$ which by contact with $TiCl_4$ under the usual conditions has produced a solid catalyst having the following compositions:
- Co: 415 g./kg.
- Cl: 503 g./kg.
- Ti: 26 g./kg.
- OH (determined by difference): 56 g./kg.

representing an OH/Co ratio of 0.23.

The polymerization of ethylene carried out with 0.300 g. of this solid catalyst and 1.0 g. of $Al(iBu)_3$ as activators, under the conditions specified in Example 12 has produced 130 g. of PE representing a catalytic activity of 4200 $PE/h.g.Ti.atm. C_2H_4$.

EXAMPLES 15 TO 17

The reaction described in Example 13 is repeated once again using $MnCl_2 \cdot 4H_2O$. After drying with $SOCl_2$, the solid product has the formula $MnCl_2 \cdot H_2O$. The monohydrate is reacted with $TiCl_4$ and after washing the reaction product has the following composition:
- Mn: 401 g./kg.
- Cl: 540 g./kg.
- Ti: 9.1 g./kg.
- OH (determined by difference): 50 g./kg.

or a OH/Mn ratio of 0.31 and an "additional Cl/Ti" ratio of 2.84.

This solid catalyst was used to carry out the polymerization according to the usual procedure, but using various activators. The results of these polymerizations are given in the following Table 5.

TABLE 5

|  | EXAMPLE 15 | EXAMPLE 16 | EXAMPLE 17 |
|---|---|---|---|
| Quantity of solid catalyst g. | 0.410 | 0.606 | 0.589 |
| Activator: |  |  |  |
| nature | $Al(iBu)_3$ | $AlEt_2Cl$ | $ZnEt_2$ |
| quantity g. | 1.00 | 1.00 | 0.99 |
| Duration of polymerization h. | 2 | 2 | 2 |
| Partial pressure $C_2H_4$ kg./cm.$^2$ | 2 | 2 | 15 |
| Partial pressure $H_2$ kg./cm.$^2$ | 4 | 4 | — |
| Polyethylene produced g. | 151 | 79 | 163 |
| Catalytic activity g.$PE/h.g.Ti.atm.C_2H_4$ | 10,280 | 3,620 | 1,025 |
| Melt index of PE g./10 min. | 12.3* | 2.1** | — |

*charge = 2.16 kg.
**charge = 21.6 kg.

EXAMPLE 18

The $MnCl_2$ monohydrate prepared in Examples 15 to 17 is used again, this time to be reacted with $VOCl_3$. The reaction is carried out at 100° C. in heptane. After washing in hexane and drying, there is obtained a solid catalyst having the following composition:
- Mn: 380 g./kg.
- Cl: 480 g./kg.
- V: 6.5 g./kg.

Polymerization is carried out with 1.233 g. of this solid catalyst and 1.0 g. of $Al(iBu)_3$ under a partial pressure of ethylene of 20 kg./cm.$^2$ has produced 5 g. of polyethylene.

EXAMPLE 19

The solid catalyst prepared in Examples 15 to 17 which contains 9.1 g. Ti/kg. was used for the copolymerization of ethylene and propylene.

This copolymerization is carried out by successively introducing into a 1.5 liter autoclave, dried and flushed with a flow of propylene, 5 ml. of a solution containing 200 g. per liter of $Al(iBu)_3$ in hexane, 0.143 g. of solid catalyst and 335 g. of liquid propylene. The reaction mixture is heated to 40° C. and hydrogen and ethylene are introduced under respective partial pressures of 0.2 kg./cm.$^2$ and 19.3 kg./cm.$^2$.

After 30 minutes, the content of the autoclave is degassed and 237 g. of a copolymer of ethylene and propylene containing 69 moles % of propylene are collected. The catalytic activity is 364,000 g. of copolymer per hour per g. of Ti.

EXAMPLE 20

The polymerization of propylene was carried out by using the same solid catalyst as in Example 19.

Into a 1.5 liter autoclave, previously dried and flushed with propylene, there were successively introduced 2 ml. of a solution containing 200 g. per liter of triisobutylaluminum in hexane and 0.520 g. of solid catalyst. Then, hydrogen was added under a partial pressure of 0.7 kg./cm.$^2$ followed by 1 liter of propylene.

The temperature of the reaction mixture was raised to 60° C. and maintained therein for 5 hours. After degassing the content of the autoclave, 50 g. of propylene were collected, indicating a catalytic activity of 2040 g. of PP/h.g.Ti.

What we claim and desire to secure by Letters Patent is:

1. A process for the polymerizaion of α-olefins and copolymerization of α-olefins with one another and with diolefins in which polymerization is carried out in the presence of a ctalyst obtained by activating with an organometallic derivative of a metal selected from the group consisting of the elements of Groups I, II, IIa and IVa of the Periodic Table, the reaction product of compounds selected from the group consisting of halides, oxyhalides, haloalkoxides, alkoxides and oxyalkoxides of transition metals selected from the group consisting of the elements of Groups IVb, Vb and VIb with a solid support of a hydrated dihalide of a bivalent metal selected from the group consisting of magnesium, calcium, chromium, manganese, iron, nickel, cobalt, copper, zinc and cadmium having from about 0.5 to 5 moles of water per mole of dihalide, said hydrated dihalide being partially hydrolyzed concurrently with the bonding with said transition metal derivative under conditions which prevent overheating leading to solidification of the reaction mixture.

2. A process according to claim 1 in which said olefin is selected from a member of the group consisting of ethylene, propylene and mixtures thereof.

3. Process according to claim 1 in which the dihalide is dichloride.

4. Process according to claim 1 in which said solid support is initially contacted with said derivative of said metal at a temperature of about 10° to 40° C. while preventing lumping of the solid support and then the reaction between said solid support and said derivative of said metal is continued at a temperature of about 40° to 180° C.

5. Process according to claim 1 in which a stream of said derivative of said metal is circulated on said support at a temperature of about 10° to 40° C. at a speed sufficient to prevent the lumping of said support.

6. Process according to claim 1 in which said support in powder form is introduced as a mist to an excess of said derivative of said metal at a temperature of about 10° to 40° C. thereby avoiding the lumping of said support.

7. A catalyst for the polymerization and copolymerization of olefins comprising an organometallic compound selected from the group consisting of the organometallic derivatives of the elements of Groups I, II, IIIa and IVa of the Periodic Table and a solid catalytic component comprising the reaction product between a transition metal derivative selected from the group consisting of halides, oxyhalides, alkoxyhalides, oxyalkoxides and alkoxides of the metals of Groups IVb, Vb and VIb of the Periodic Table and a hydrated dihalide of a bivalent metal selected from the group consisting of magnesium, calcium, chromium, manganese, iron, nickel, cobalt, copper, zinc and cadmium having from about 0.5 to 5 moles of water of hydration per mole of dihalide, said hydrated dihalide being partially hydrolyzed concurrently with the bonding with said transition metal derivative under conditions which prevent overheating leading to solidification of the reaction mixture.

8. A catalyst according to claim 7 in which the bivalent metal is magnesium.

9. A catalyst according to claim 7 in which said transition metal derivative is selected from the group consisting of halides, oxyhalides, alkoxyhalides, oxyalkoxides, and alkoxides of titanium.

10. A catalyst according to claim 7 in which said transition metal derivative is selected from the group consisting of $TiCl_4$, $TiCl_2(OC_2H_5)_2$, $Ti(OC_4H_9)_4$, $VCL_4$, $VOCl_3$, $VO(OC_4H_9)_3$, and $CrO_2Cl_2$.

11. A catalyst according to claim 7 in which the organometallic compound is an organoaluminum compound.

12. A catalyst according to claim 7 in which the dihalide is a dichloride.

13. A catalyst according to claim 7 in which the hydrated dihalide is a monohydrate.

14. A catalyst according to claim 7 in which said solid support is initially contacted with said derivative of said metal at a temperature of about 10° to 40° C. while preventing lumping of the solid support and then the reaction between said solid support and said derivative of said metal is continued at a temperature of about 40° to 180° C.

15. Process for the preparation of a solid catalyst component for use in the polymerization and copolymerization of olefins, in which said catalyst component is activated by an organometallic derivative of a metal of Groups I, II, IIIa or IVa of the Periodic Table which comprises reacting a solid support consisting of a hydrated dihalide of magnesium, calcium, chromium, manganese, iron, nickel, cobalt, copper, zinc or cadmium having about 0.5 to 5 moles of water per mole of dihalide with a derivative of a transition metal selected from halides, oxyhalides, alkoxyhalides, oxyalkoxides, and alkoxides of the metals of Groups IVb, Vb or VIb of the Periodic Table in the liquid state, said hydrated dihalide being partially hydrolyzed concurrently with the bonding with said transition metal derivative under conditions which prevent overheating leading to solidification of the reaction mixture.

16. Process according to claim 15 in which said solid support is initially contacted with said derivative of said metal at a temperature of about 10° to 40° C. while preventing lumping of the solid support and then the reaction between said solid support and said derivative of said metal is continued at a temperature of about 40° to 180° C.

17. Process according to claim 15 in which said solid support is mixed with said derivative of said metal at a temperature of about 10° to 40° C. and under sufficient agitation to prevent lumping of said solid support.

18. Process according to claim 15 in which a stream of said derivative of said metal is circulated on said support at a temperature of about 10° to 40° C. at a speed sufficient to prevent the lumping of said support.

19. Process according to claim 15 in which said support in powder form is introduced as a mist to an excess of said derivative of said metal at a temperature of about 10° to 40° C. thereby avoiding the lumping of said support.

20. A process for preparing a supported catalytic component to be used with a second catalytic component consisting of a hydride or organometallic compound of a metal belonging to Group I, II, IIIa, or IVa of the Mendelyeev Periodic Table for the polymerization of olefins, comprising the step of reacting by contacting a hydrated magnesium bichloride containing from 0.5 to 5 moles of water with a sufficient excess of a normally liquid titanium or vanadium halide to prevent solidification of the reaction mixture, heating said excess at a temperature between 40° C. and 180° C., and thereafter removing the liquid phase from the reaction zone.

21. The process according to claim 20 characterized in that the hydrated magnesium bichloride is selected from the magnesium bichloride containing 1 mole of $H_2O$.

22. The process according to claim 20 characterized in that the liquid titanium or vanadium halide is selected from the group consisting of the tetrahalides of said metals.

23. A process for preparing a catalyst for the polymerization of olefins consisting in reacting a supported catalytic component according to the process of claim 20 with a hydride or organometallic compound of a metal belonging to Group I, II, III, or IVa of the Mendelyeev Periodic System.

24. The process for the polymerization of ethylene and mixtures thereof with higher alpha-olefins and/or diolefins, characterized in that the polymerization is carried out in the presence of a catalyst prepared by the process of claim 23.

25. A process for the polymerization of olefins and copolymerization of α-olefins with one another and with diolefins in which polymerization is carried out in the presence of a catalyst obtained by activating with an organometallic derivative of a metal selected from the Group consisting of the elements of Groups I, II, IIIa and IVa of the Periodic Table, the reaction product of compounds selected from the group consisting of halides, oxyhalides, haloalkoxides, alkoxides and oxyalkoxides of transition metals selected from the group consisting of the elements of Groups IVb, Vb and VIb with a solid support of a hydrated dihalide of a bivalent metal selected from the group consisting of a magnesium, calcium, chromium, manganese iron, nickel, cobalt, copper, zinc, and cadmium having from about 0.5 to 5 moles of water per mole of dihalide, said hydrated dihalide being partially hydrolyzed concurrently with the bonding with said transition metal derivative by initial contacting under conditions which prevent overheating leading to solidification of the reaction mixture and heating at a temperature between 40° and 180° C.

26. A catalyst for the polymerization and copolymerization of olefins comprising an organometallic compound selected from the group consisting of the organometallic derivatives of the elements of Groups I, II, IIIa and IVa of the Periodic Table and a solid catalytic component comprising the reaction product of compounds selected from the group consisting of halides, oxyhalides, haloalkoxides, alkoxides and oxyalkoxides of transition metals selected from the group consisting of the elements of Groups IVb, Vb and VIb with a solid support of a hydrated dihalide of a bivalent metal selected from the group consisting of a magnesium, calcium, chromium, manganese, iron, nickel, cobalt, copper, zinc, and cadmium having from about 0.5 to 5 moles of water per mole of dihalide, said hydrated dihalide being partially hydrolyzed concurrently with the bionding with said transition metal derivative by initial contacting under conditions which prevent overheating leading to solidification of the reaction mixture and heating at a temperature between 40° and 180° C.

27. A process for the preparation of a solid catalyst component for use in the polymerization and copolymerization of olefins, in which said catalyst component is activated by an organometallic derivative of a metal of Groups I, II, IIIa or IVa of the Periodic Table which comprises reacting a solid support consisting of a hydrated dihalide of magnesium, calcium, chromium, manganese, iron, nickel, cobalt, copper, zinc, or cadmium having about 0.5 to 5 moles of water per mole of dihalide wit a derivative of a transition metal selected from halides, oxyhalides, alkoxyhalides, oxyalkoxides and alkoxides of the metals of Groups IVb, Vb or VIb of the Periodic Table in the liquid state, said hydrated dihalide being partially hydrolyzed concurrently with the bonding with said transition metal derivative by initial contacting under conditions which prevent overheating leading to solidification of the reaction mixture and heating at a temperature between 40° and 180° C.

28. A process for preparing a supported catalytic component to be used with a second catalytic component consisting of a hydride or organometallic compound of a metal belonging to Group I, II, IIIa, or IVa of the Mendelyeev Periodict Table for the polymerization of olefins, comprising the step of reacting by contacting a hydrated magnesium bichloride containing from 0.5 to 5 moles of water with a sufficient excess of a normally liquid titanium or vanadium halide to prevent solidification of the reaction mixture, said titanium or vanadium halide being mixed with the hydrated magnesium bichloride, the mixture then being heated at a temperature between 40° C. and 180° C. and thereafter removing the liquid phase from the reaction zone.

29. The process according to claim 28, characterized in that the hydrated magnesium bichloride is selected from the magnesium bichloride containing 1 mole of $H_2O$.

30. The process according to claim 28, characterized in that the liquid titanium or vanadium halide is selected from the group consisting of the tetrahalides of said metals.

31. A process for preparing a catalyst for the polymerization of olefins consisting in reacting a supported catalytic component prepared according to the process of claim 28 with a hydride or organometallic compound of a metal belonging to Group I, II, IIIa, or IVa of the Periodic Table.

32. The process for the polymerization of ethylene and mixtures thereof with higher alpha-olefins and/or diolefins characterized in that the polymerization is carried out in the presence of a catalyst prepared by the process of claim 31.

33. The process according to claim 32 characterized in that the polymerization is carried out at temperatures comprised between 40° and 80° C. in the presence of an inert liquid and of a regulator of the molecular weight of the polymer and in that the polymer thus obtained does not require any purification treatment for the removal of catalyst residue therefrom.

34. The process according to claim 32 characterized in that the polymerization is carried out in the absence of an inert diluent.

35. A process for preparing a supported catalytic component to be used with a second catalytic component consisting of a hydride or organometallic compound of a metal belonging to Group I, II, IIa, or IVa of the Mendeleev Periodic Table for the polymerization of olefins, comprising the step of reacting by contacting a hydrated magnesium bihalide containing from 0.5 to 5 moles of water with an excess of a normally liquid titanium or vanadium halide, said excess of titanium or vanadium halide being present in an amount sufficient to prevent solidification of the reaction mixture, heating said excess at a temperature of about 40° C., and thereafter removing the liquid phase from the reaction zone.

* * * * *